United States Patent
Di et al.

(10) Patent No.: US 9,497,628 B2
(45) Date of Patent: Nov. 15, 2016

(54) METHOD AND TERMINAL FOR OBTAINING INFORMATION

(71) Applicant: Xiaomi Inc., Beijing (CN)

(72) Inventors: Hao Di, Beijing (CN); Wei Sun, Beijing (CN); Xinming Shi, Beijing (CN)

(73) Assignee: Xiaomi Inc., Beijing (CN)

( * ) Notice: Subject to any disclaimer, the term of this patent is extended or adjusted under 35 U.S.C. 154(b) by 71 days.

(21) Appl. No.: 14/156,767

(22) Filed: Jan. 16, 2014

(65) Prior Publication Data

US 2014/0308922 A1 Oct. 16, 2014

Related U.S. Application Data

(63) Continuation of application No. PCT/CN2013/085849, filed on Oct. 24, 2013.

(30) Foreign Application Priority Data

Apr. 16, 2013 (CN) .......................... 2013 1 0131976

(51) Int. Cl.
| | |
|---|---|
| *H04M 1/66* | (2006.01) |
| *H04M 1/68* | (2006.01) |
| *H04M 3/16* | (2006.01) |
| *H04W 12/06* | (2009.01) |
| *H04W 4/00* | (2009.01) |

(52) U.S. Cl.
CPC ............. *H04W 12/06* (2013.01); *H04W 4/008* (2013.01)

(58) Field of Classification Search
CPC ... H04W 12/06; H04W 12/08; H04W 4/008; H04W 8/06; H04W 12/00
See application file for complete search history.

(56) References Cited

U.S. PATENT DOCUMENTS

| 7,712,131 B1 * | 5/2010 | Lethe .................. G06F 21/57 701/29.1 |
| 8,295,811 B1 | 10/2012 | Gailloux et al. |
| 2004/0235522 A1 * | 11/2004 | Lin .............................. 455/558 |
| 2007/0208929 A1 * | 9/2007 | Lin ..................... G06F 9/4411 713/2 |
| 2009/0192907 A1 | 7/2009 | Bossemeyer, Jr. et al. |
| 2009/0258678 A1 | 10/2009 | Chava et al. |
| 2010/0304670 A1 | 12/2010 | Shuo |
| 2011/0034124 A1 | 2/2011 | Shiota et al. |
| 2012/0072350 A1 | 3/2012 | Goldthwaite et al. |

(Continued)

FOREIGN PATENT DOCUMENTS

| CN | 102264061 | 11/2011 |
| CN | 202049495 | 11/2011 |

(Continued)

OTHER PUBLICATIONS

European Search Report dated Feb. 10, 2016, issued from European Patent Office in Application No. EP 13882421 (10 pages).

(Continued)

*Primary Examiner* — Ajit Patel
(74) *Attorney, Agent, or Firm* — Finnegan, Henderson, Farabow, Garrett & Dunner LLP

(57) ABSTRACT

A method for a terminal to obtain information includes reading authentication information stored by a smart card external to the terminal, the authentication information being provided by an operator; storing the read authentication information in a memory of the terminal; and obtaining a service provided by the operator according to the authentication information stored in the memory.

12 Claims, 10 Drawing Sheets

(56) References Cited

U.S. PATENT DOCUMENTS

| | | | |
|---|---|---|---|
| 2012/0117635 A1* | 5/2012 | Schell et al. ............... 726/9 |
| 2012/0317628 A1 | 12/2012 | Yeager | |
| 2013/0303128 A1* | 11/2013 | Wang ............... H04L 63/0876 |
| | | | 455/411 |
| 2014/0057558 A1* | 2/2014 | Cooper ...................... 455/41.1 |
| 2015/0079982 A1 | 3/2015 | Wu et al. | |

FOREIGN PATENT DOCUMENTS

| | | |
|---|---|---|
| CN | 102932557 A | 2/2013 |
| CN | 103268462 | 8/2013 |
| EP | 2701414 A1 | 2/2014 |
| JP | 2010-277527 | 9/2010 |
| JP | 2012-528534 | 11/2012 |
| JP | 2013-017164 | 1/2013 |
| KR | 10-1191345 | 10/2012 |
| RU | 2409864 | 1/2011 |
| WO | WO 2012/177200 A1 | 12/2012 |

OTHER PUBLICATIONS

Substantive Examination Enquiry for Russian Application No. 2015127201/08, dated Jun. 3, 2016.

* cited by examiner

800

METHOD AND TERMINAL FOR OBTAINING INFORMATION

CROSS REFERENCE TO RELATED APPLICATIONS

The present application is a continuation of International Application No. PCT/CN2013/085849, filed Oct. 24, 2013, which is based upon and claims priority to Chinese Patent Application No. 201310131976.8, filed Apr. 16, 2013, the entire contents of all of which are incorporated herein by reference.

TECHNICAL FIELD

The present disclosure generally relates to the technical field of wireless communication and, more particularly, to a method and a terminal for obtaining information.

BACKGROUND

When a user uses a terminal, such as a mobile phone, to obtain a service provided by an operator, the terminal generally needs to firstly obtain authentication information provided by the operator for, e.g., registering with a network of the operator. Conventionally, the authentication information is stored in a subscriber identity module (SIM) card, and the user generally needs to insert the SIM card into a SIM card slot in the terminal. The terminal can then obtain the service provided by the operator after reading the authentication information stored in the SIM card and performing an authenticating process with the operator.

Because the terminal needs to reserve the SIM card slot for the SIM card, a certain space on a circuit board of the terminal is occupied, which reduces a number of electronic components that can be integrated on the circuit board and, thus, may limit expansion of the terminal's functions. In addition, an electromagnetic coupling degree between electronic components on the circuit board is increased, and electromagnetic compatibility of the terminal is reduced. Additionally, a size of the terminal may be increased due to the SIM card slot.

SUMMARY

According to a first aspect of the present disclosure, there is provided a method for a terminal to obtain information, comprising: reading authentication information stored by a smart card external to the terminal, the authentication information being provided by an operator; storing the read authentication information in a memory of the terminal; and obtaining a service provided by the operator according to the authentication information stored in the memory.

According to a second aspect of the present disclosure, there is provided a terminal, comprising: a processor; and a memory for storing instructions executable by the processor; wherein the processor is configured to: read authentication information stored by a smart card external to the terminal, the authentication information being provided by an operator; store the read authentication information in the memory; and obtain a service provided by the operator according to the authentication information stored in the memory.

According to a third aspect of the present disclosure, there is provided a non-transitory computer-readable medium having stored therein instructions that, when executed by a processor of a terminal, cause the terminal to perform a method for obtaining information, the method comprising: reading authentication information stored by a smart card external to the terminal, the authentication information being provided by an operator; storing the read authentication information in a memory of the terminal; and obtaining a service provided by the operator according to the authentication information stored in the memory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
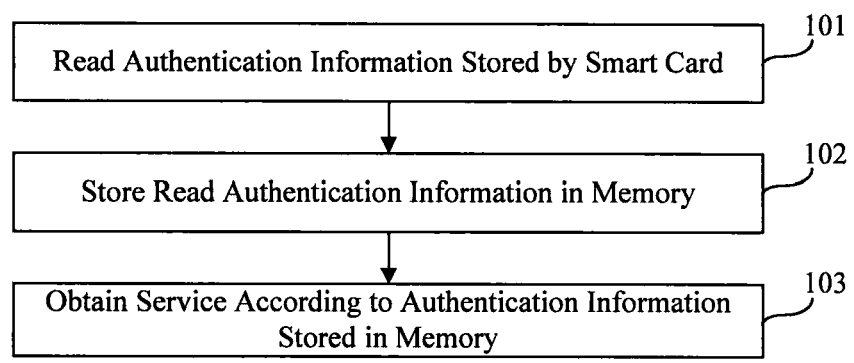
FIG. 1 is a flowchart of a method for a terminal to obtain authentication information, according to an exemplary embodiment.

FIG. 1 is a flowchart of a method 100 for a terminal to obtain authentication information, according to an exemplary embodiment. For example, the terminal may be a mobile phone. Referring to FIG. 1, the method 100 includes the following steps.

In step 101, the terminal reads authentication information stored by a smart card external to the terminal. For example, when a user uses the terminal to obtain a service provided by an operator, the terminal may firstly read authentication information stored by the smart card, the authentication information being provided by the operator. Also for example, the smart card can store authentication information provided by one or more operators.

In step 102, the terminal stores the read authentication information in a memory of the terminal, after the terminal reads the authentication information from the smart card.

In step 103, the terminal obtains a service provided by the operator according to the authentication information stored in the memory.

In the method 100, the terminal does not need to have a SIM card slot for a SIM card, and space is saved on a circuit board of the terminal, which may reduce a coupling degree between electronic components in the terminal and improve electromagnetic compatibility of the terminal. In addition, the terminal's functions may be expanded if more electronic components are integrated on the circuit board. Alternatively, a size of the terminal may be reduced.

Figure 2:
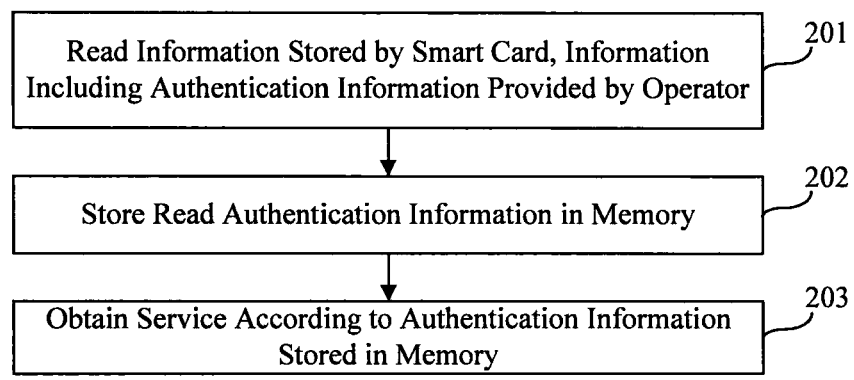
FIG. 2 is a flowchart of a method for a terminal to obtain authentication information, according to an exemplary embodiment.

FIG. 2 is a flowchart of a method 200 for a terminal to obtain authentication information, according to an exemplary embodiment. For example, the terminal may be a mobile phone. Referring to FIG. 2, the method 200 includes the following steps.

In step 201, the terminal reads information stored by a smart card external to the terminal, the information including authentication information provided by an operator. For example, when a user uses the terminal to obtain a service provided by the operator, the terminal may read the information stored by the smart card, the information including authentication information provided by the operator.

In exemplary embodiments, to facilitate the terminal reading of the authentication information stored by the smart card, the authentication information is stored by the smart card in a predetermined storage manner when the smart card is manufactured. For example, the predetermined storage manner includes at least one of a near field communication (NFC) tag, which is based on a short-range wireless communication technology, or a two-dimensional barcode. Because the smart card can store the authentication information in different manners, the terminal reads the authentication information in different manners.

In one exemplary embodiment, the authentication information is stored using the NFC tag. Accordingly, the terminal reads the NFC tag of the smart card to obtain the authentication information stored by the smart card, by using the NFC technology. In one exemplary embodiment, the authentication information is stored using the two-dimensional barcode. Accordingly, the terminal reads the two-dimensional barcode on the smart card to obtain the authentication information stored by the smart card, by using the two dimensional barcode scanning technology. For example, the operator compiles the authentication information, which is conventionally stored by a SIM card, into the two dimensional barcode to be carried on the smart card. When the terminal reads the authentication information of the smart card, the terminal may use a built-in two-dimensional barcode scanner to scan the two-dimensional barcode on the smart card, so as to obtain the authentication information stored by the smart card.

In exemplary embodiments, the authentication information may be stored by the smart card by different storage manners according to different use requirements. For example, a part of the authentication information is stored by the smart card using a NFC tag, and another part of the authentication information is stored by the smart card using a two-dimensional barcode. Accordingly, the terminal reads the NFC tag of the smart card by using the NFC technology, and reads the two-dimensional barcode on the smart card by using the two-dimensional barcode scanning technology, so as to obtain all of the authentication information stored by the smart card.

Still referring to FIG. 2, in step 202, the terminal stores the read authentication information into a memory of the terminal. In the illustrated embodiment, to facilitate the terminal obtaining the service from the operator, the terminal stores the read authentication information into the memory of the terminal and directly reads the authentication information from the memory in subsequent use, so that the terminal does not need to read the authentication information of the smart card every time obtaining the service from the operator.

In one exemplary embodiment, the terminal stores the read authentication information into a preset region of the memory, and sets the preset region of the memory as a read-only region. In the illustrated embodiment, the memory of the terminal may need to store various information such as photos, short messages, and phone numbers. To facilitate the terminal directly reading the authentication information in the memory, and reduce the association between the region for storing the authentication information and other regions in the memory, the terminal stores the read authentication information into the preset region of the memory after the terminal reads the authentication information of the smart card. Further, to prevent the authentication information stored in the memory from being inadvertently deleted by the user, the terminal sets the preset region as a read-only region after the terminal stores the authentication information into the preset region.

In step 203, the terminal obtains the service from the operator according to the authentication information stored in the memory. For example, when the terminal needs to obtain the service provided by the operator, the terminal reads the authentication information from the memory, performs an authentication process with the operator according to the authentication information, and obtains the service after the authentication passes.

Figure 3:
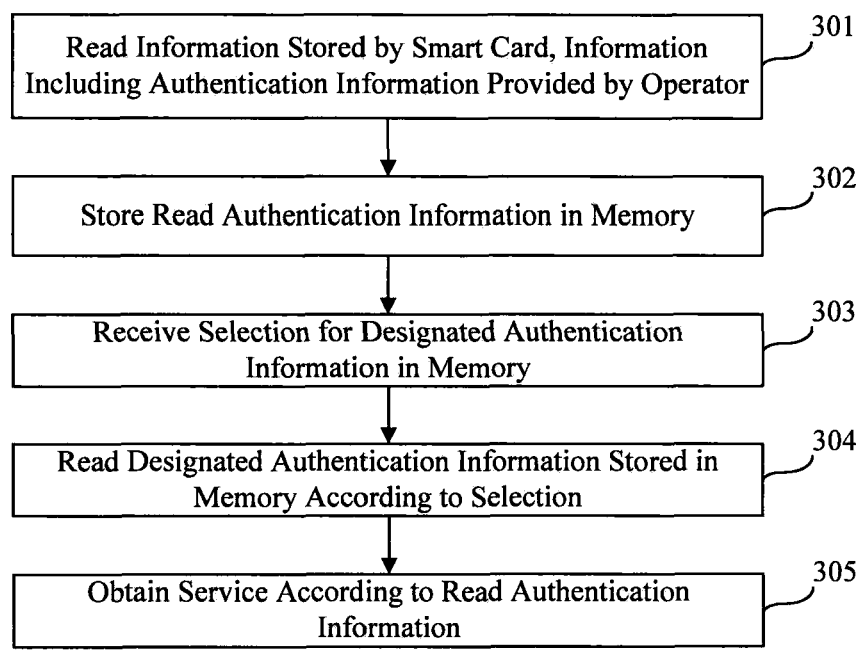
FIG. 3 is a flowchart of a method for a terminal to obtain authentication information, according to an exemplary embodiment.

FIG. 3 is a flowchart of a method 300 for a terminal to obtain authentication information, according to an exemplary embodiment. For example, the terminal may be a mobile phone. Referring to FIG. 3, the method 300 includes the following steps.

In step 301, the terminal reads information stored by a smart card external to the terminal, the information including authentication information provided by an operator. In step 302, the terminal stores the read authentication information into a memory of the terminal. The terminal performs steps 301 and 302 in a similar way to steps 201 and 202 (FIG. 2), respectively. In addition, in the illustrated embodiment, the terminal may obtain services provided by the operator by using different authentication information according to different use requirements. For example, every time the user travels to a new place, the terminal obtains a service provided by the operator or a different operator by using new authentication information corresponding to the new place. The terminal may read the new authentication information corresponding to the new place from the smart card, and store the read authentication information into the memory of the terminal. As a result, the memory of the terminal stores two or more items of authentication information.

In step 303, the terminal receives a selection for designated authentication information in the memory. For example, when the user uses the terminal to obtain the service from the operator in a place, the user may select a corresponding item of authentication information stored in the memory.

Figure 4:
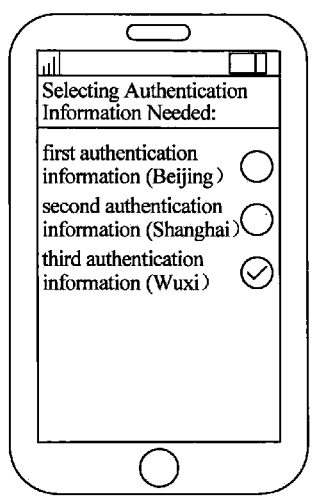
FIG. 4 is a diagram of a display on a terminal for a user to select authentication information, according to an exemplary embodiment.

In one exemplary embodiment, the memory of the terminal stores a first item of authentication information, a second item of authentication information, and a third item of authentication information, corresponding to first, second, and third places, such as Beijing, Shanghai, and Wuxi, respectively. If the user is now traveling in Wuxi, to save telephone expense, the user may select the third item of authentication information stored in the memory of the terminal to obtain a service provided by the operator. FIG. 4 is a display 400 on the terminal for the user to select the third item of authentication information in a selection menu, according to an exemplary embodiment.

In exemplary embodiments, when the terminal stores each item of authentication information into the memory, the terminal may mark the item of authentication information by, e.g., setting a serial number for the item of authentication information, such that when an item of authentication information in the memory is needed, the user may select the serial number corresponding to the needed item of authentication information.

Referring back to FIG. 3, in step 304, the terminal reads the designated authentication information stored in the memory according to the selection, after the terminal receives the selection for the designated authentication information.

In step 305, the terminal obtains the service provided by the operator according to the read authentication information. For example, in the above illustrated embodiment, after the terminal receives the selection for the third item of authentication information corresponding to Wuxi, the terminal reads the third item of authentication information, thereby to use the third item of authentication information to perform an authentication process with the operator, and obtain the service provided by the operator, such as telephone calling, messaging, or connecting to a network, after the authentication passes.

In the method 300, when the authentication information needs to be changed, the user only needs to select authentication information stored in the terminal, without pulling out an original SIM card and inserting a new SIM card, as in the conventional method. Accordingly, use convenience is improved.

Figure 5:
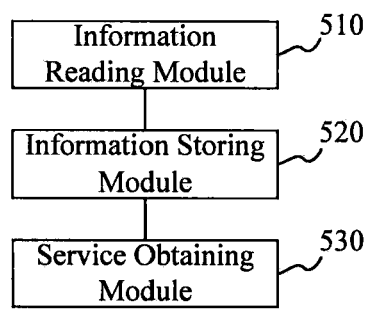
FIG. 5 is a block diagram of a device for obtaining authentication information, according to an exemplary embodiment.

FIG. 5 is a block diagram of a device 500 for obtaining authentication information, according to an exemplary embodiment. For example, the device 500 may be a terminal, such as a mobile phone, or a part of a terminal. Referring to FIG. 5, the device 500 includes an information reading module 510, an information storing module 520, and a service obtaining module 530.

In exemplary embodiments, the information reading module 510 is configured to read information stored by a smart card, the information including authentication information provided by an operator. The information storing module 520 is configured to store the authentication information read by the information reading module 510 in a memory. The service obtaining module 530 is configured to obtain a service provided by the operator according to the authentication information stored in the memory.

Figure 6:
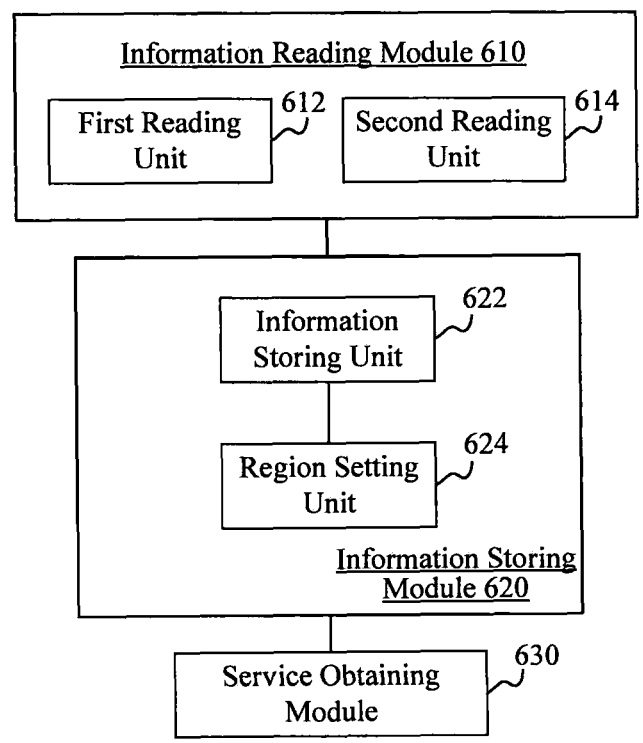
FIG. 6 is a block diagram of a device for obtaining authentication information, according to an exemplary embodiment.

FIG. 6 is a block diagram of a device 600 for obtaining authentication information, according to an exemplary embodiment. For example, the device 600 may be a terminal, such as a mobile phone, or a part of a terminal. Referring to FIG. 6, the device 600 includes an information reading module 610, an information storing module 620, and a service obtaining module 630.

The information reading module 610 is configured to read information stored by a smart card, the information including authentication information provided by an operator. The information storing module 620 is configured to store the authentication information read by the information reading module 610 in a memory. The service obtaining module 630 is configured to obtain a service provided by the operator according to the authentication information stored in the memory. The authentication information is stored by the smart card in a predetermined storage manner, including at least one of a NFC tag or a two-dimensional barcode.

In exemplary embodiments, the information reading module 610 includes a first reading unit 612 and a second reading unit 614. The first reading unit 612 is configured to obtain the authentication information stored by the smart card by reading the NFC tag of the smart card based on the NFC technology, if the predetermined storage manner includes a NFC tag. The second reading unit 614 is configured to obtain the authentication information stored by the smart card by reading the two-dimensional barcode on the smart card based on the two-dimensional barcode scanning technology, if the predetermined storage manner includes the two-dimensional barcode.

In exemplary embodiments, the information storing module 620 includes an information storing unit 622 and a region setting unit 624. The information storing unit 622 is configured to store the read authentication information into a preset region of the memory, and the region setting unit 624 is configured to set the preset region of the memory as a read-only region.

Figure 7:
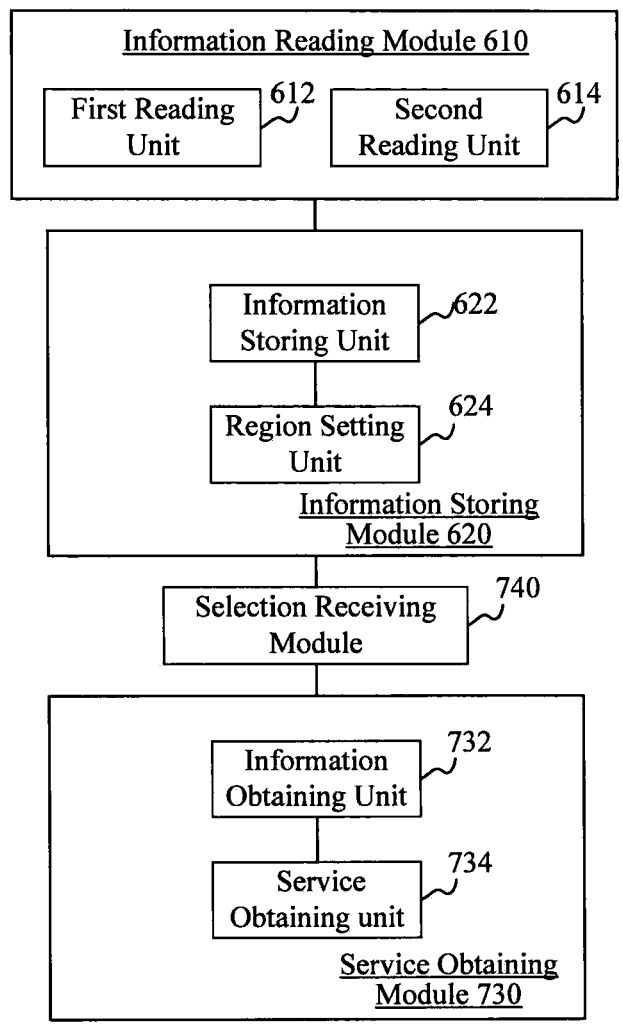
FIG. 7 is a block diagram of a device for obtaining authentication information, according to an exemplary embodiment.

FIG. 7 is a block diagram of a device 700 for obtaining authentication information, according to an exemplary embodiment. For example, the device 700 may be a terminal, such as a mobile phone, or a part of a terminal. Referring to FIG. 7, in addition to the information reading module 610 and the information storing module 620 (FIG. 6), the device 700 also includes a selection receiving module 740 and a service obtaining module 730 that further includes an information obtaining unit 732 and a service obtaining unit 734.

In exemplary embodiments, the selection receiving module 740 is configured to receive a selection for designated authentication information in the memory. The information obtaining unit 732 is configured to read the designated authentication information stored in the memory according to the selection received by the selection receiving module 740, and the service obtaining unit 734 is configured to obtain a service provided by the operator according to the authentication information read by the information obtaining unit 732.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Figure 8:
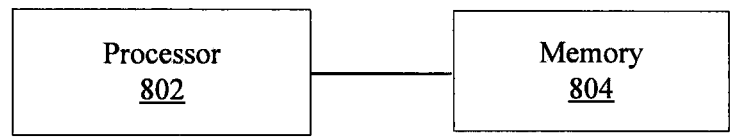
FIG. 8 is a block diagram of a terminal, according to an exemplary embodiment.

FIG. 8 is a block diagram of a terminal 800, according to an exemplary embodiment. For example, the terminal 800 may be a mobile phone, a handheld device, etc. Referring to FIG. 8, the terminal 800 includes a processor 802 configured to execute program instructions to perform the above described methods for obtaining authentication information, and a memory 804 configured to store information and program instructions and otherwise facilitate operation of the processor 802.

In exemplary embodiments, there is also provided a non-transitory computer-readable medium having stored therein instructions, such as included in the memory 804, executable by the processor 802 in the terminal 800, for performing the above described methods for obtaining authentication information. For example, the non-transitory computer-readable medium may be a read-only memory, a magnetic disc, an optical disc or the like.

Figure 9A:
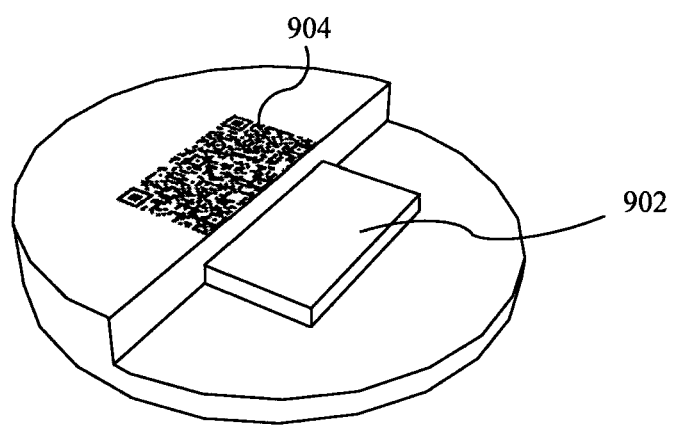
FIGS. 9A and 9B show an internal view and an external view of a smart card, respectively, according to an exemplary embodiment.
Figure 9B:
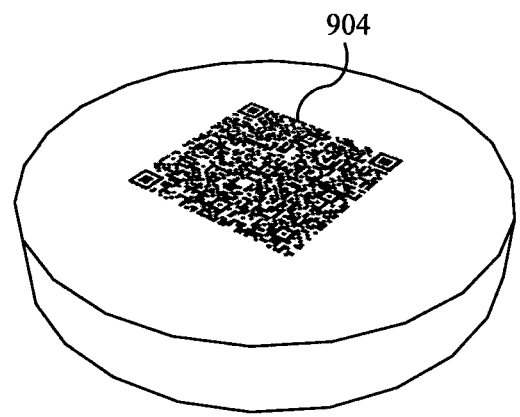

FIGS. 9A and 9B show an internal view and an external view of a smart card 900, respectively, according to an exemplary embodiment. For example, the smart card 900 may be the above-described smart card for storing authentication information provided by one or more operators. Referring to FIGS. 9A and 9B, in one exemplary embodiment, the smart card 900 includes at least one of a chip 902 supporting the NFC technology or a storage medium 904 for storing a two-dimensional barcode. The smart card 900 may be manufactured into any shape according to use requirements. In the illustrated embodiment, the smart card 900 has a shape of a small disk.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a wireless communication terminal to obtain information, comprising:
   reading authentication information stored by a smart card external to the wireless communication terminal, the authentication information being provided by an operator;
   storing the authentication information in a preset region of a memory of the wireless communication terminal, and setting the preset region of the memory of the wireless communication terminal as a read-only region after the wireless communication terminal reads and stores the authentication information; and
   obtaining a service provided by the operator according to the authentication information stored in the memory.

2. The method according to claim 1, wherein the authentication information is stored by the smart card in a predetermined storage manner, including storing by at least one of a near field communication (NFC) tag based on a short-range wireless communication technology or a two-dimensional barcode.

3. The method according to claim 1, wherein the reading of the authentication information comprises at least one of:
   reading a near field communication (NFC) tag of the smart card to obtain the authentication information stored by the smart card by using a NFC technology; or
   reading a two-dimensional barcode on the smart card to obtain the authentication information stored by the smart card by using a two-dimensional barcode scanning technology.

4. The method according to claim 1, wherein a plurality of items of authentication information are stored in the memory of the wireless communication terminal, the method further comprising:
   receiving a selection for one of the plurality of items of authentication information in the memory;
   reading the selected item of authentication information stored in the memory; and
   obtaining the service provided by the operator according to the selected item of authentication information.

5. A wireless communication terminal, comprising:
   a processor; and
   a memory for storing instructions executable by the processor;
   wherein the processor is configured to:
      read authentication information stored by a smart card external to the wireless communication terminal, the authentication information being provided by an operator;
      store the authentication information in a preset region of the memory of the wireless communication terminal, and set the preset region of the memory of the wireless communication terminal as a read-only region after the processor reads and stores the authentication information; and
      obtain a service provided by the operator according to the authentication information stored in the memory.

6. The wireless communication terminal according to claim 5, wherein the processor is further configured to:
   read a near field communication (NFC) tag of the smart card to obtain the authentication information stored by the smart card, by using a NFC technology.

7. The wireless communication terminal according to claim 5, wherein the processor is further configured to:
   read a two-dimensional barcode on the smart card to obtain the authentication information stored by the smart card, by using a two-dimensional barcode scanning technology.

8. The wireless communication terminal according to claim 5, wherein a plurality of items of authentication information are stored in the memory, the processor being further configured to:
   receive a selection for one of the plurality of items of authentication information in the memory;
   read the selected item of authentication information stored in the memory; and
   obtain the service provided by the operator according to the selected item of authentication information.

9. A non-transitory computer-readable medium having stored therein instructions that, when executed by a processor of a wireless communication terminal, cause the wireless communication terminal to perform a method for obtaining information, the method comprising:
   reading authentication information stored by a smart card external to the wireless communication terminal, the authentication information being provided by an operator;
   storing the authentication information in a preset region of a memory of the wireless communication terminal, and setting the preset region of the memory of the wireless communication terminal as a read-only region after the wireless communication terminal reads and stores the authentication information; and obtaining a service provided by the operator according to the authentication information stored in the memory.

10. The non-transitory computer-readable medium according to claim 9, wherein the authentication information is stored by the smart card in a predetermined storage manner, including storing by at least one of a near field communication (NFC) tag based on a short-range wireless communication technology or a two-dimensional barcode.

11. The non-transitory computer-readable medium according to claim 9, wherein the reading of the authentication information comprises at least one of:
   reading a near field communication (NFC) tag of the smart card to obtain the authentication information stored by the smart card, by using a NFC technology; or
   reading a two-dimensional barcode on the smart card to obtain the authentication information stored by the smart card, by using a two-dimensional barcode scanning technology.

12. The non-transitory computer-readable medium according to claim 9, wherein a plurality of items of authentication information are stored in the memory of the wireless communication terminal, the method further comprising:
   receiving a selection for one of the plurality of items of authentication information in the memory;
   reading the selected item of authentication information stored in the memory; and
   obtaining the service provided by the operator according to the selected item of authentication information.

\* \* \* \* \*